United States Patent [19]

Proulx

[11] 4,097,991
[45] Jul. 4, 1978

[54] ROTARY CUTTING HEAD FOR MOWERS EQUIPPED WITH FLEXIBLE CUTTING BLADES

[76] Inventor: Raymond E. Proulx, 1538 N. 1st Ave., Upland, Calif. 91786

[21] Appl. No.: 722,105

[22] Filed: Sep. 10, 1976

[51] Int. Cl.² .................. A01D 55/18; B26B 27/00
[52] U.S. Cl. ........................................ 30/276; 56/12.7
[58] Field of Search ............... 30/276, 347; 56/12.7, 56/295; 43/20

[56] References Cited

U.S. PATENT DOCUMENTS

| | | | |
|---|---|---|---|
| 2,034,917 | 3/1936 | Miller | 43/20 X |
| 3,664,102 | 5/1972 | Reber | 56/295 |
| 3,826,068 | 7/1974 | Ballas et al. | 56/12.7 |
| 4,020,552 | 5/1977 | Mizuno | 30/276 |
| 4,024,635 | 5/1977 | Mizuno | 30/276 |
| 4,043,103 | 8/1977 | Lakin | 30/276 |

FOREIGN PATENT DOCUMENTS 556,632  12/1974  Switzerland ............... 30/276

Primary Examiner—Jimmy C. Peters
Attorney, Agent, or Firm—Boniard I. Brown

[57] ABSTRACT

An improved cutting head for rotary mowers, trimmers and edgers for vegetation is constructed with a generally cylindrical rotating body from which flexible flair-like cutting blades extend radially in a plane orthogonal to the rotational axis. The flails are preferentially formed of nylon monofilament and exit through grommets secured in the rotating body. The inner and outer portions of the channels through the grommets are flared into curvilinear funnels to allow the blade filaments to be flexed in any direction without undue stress. The flails are additionally protected by circumferential flanges running around the periphery of the cutting head, above and below the cutting plane, which project to radial dimensions beyond the outer lips of the grommets to prevent the filaments from being trapped between the body and a foreign object.

11 Claims, 6 Drawing Figures

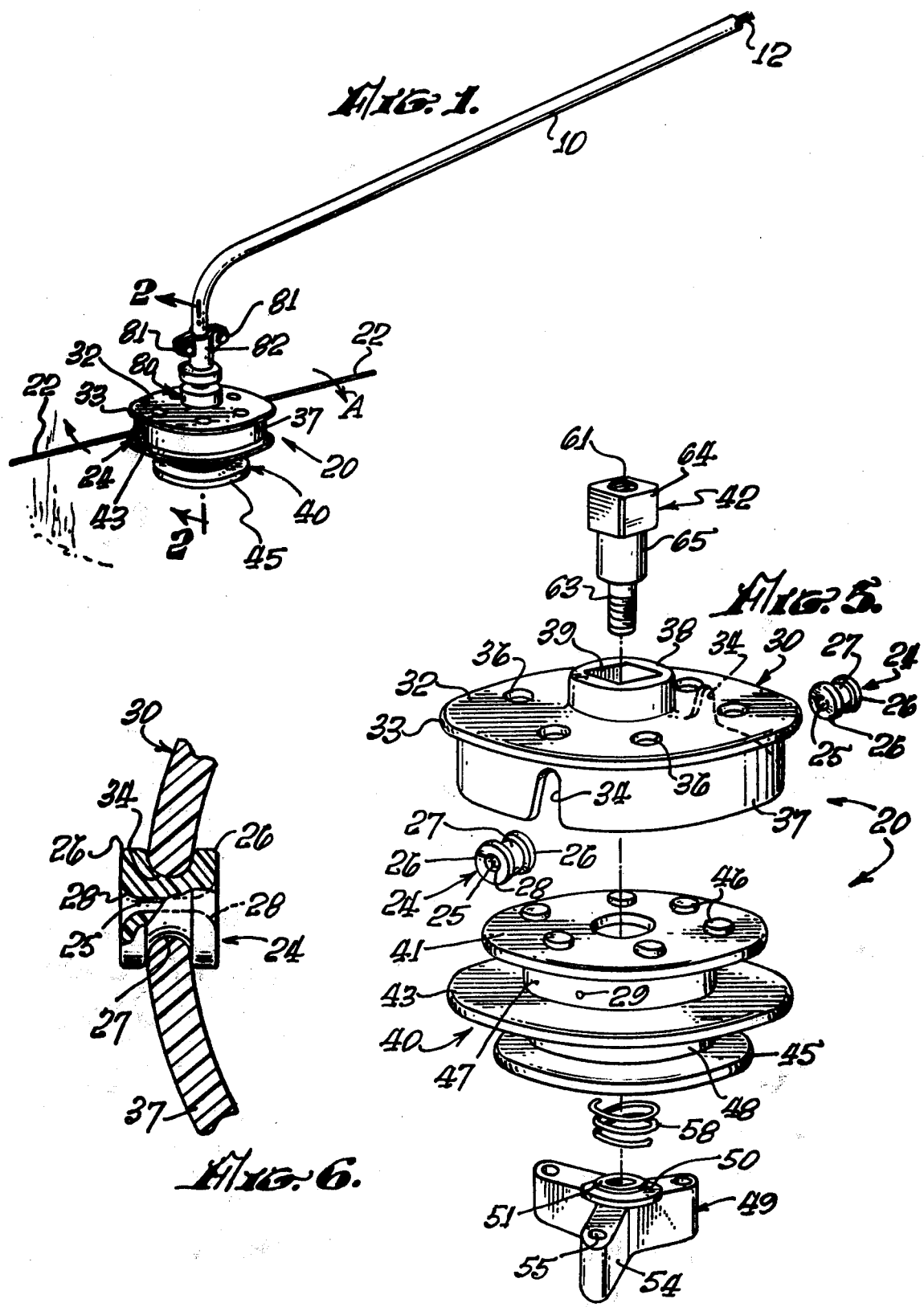

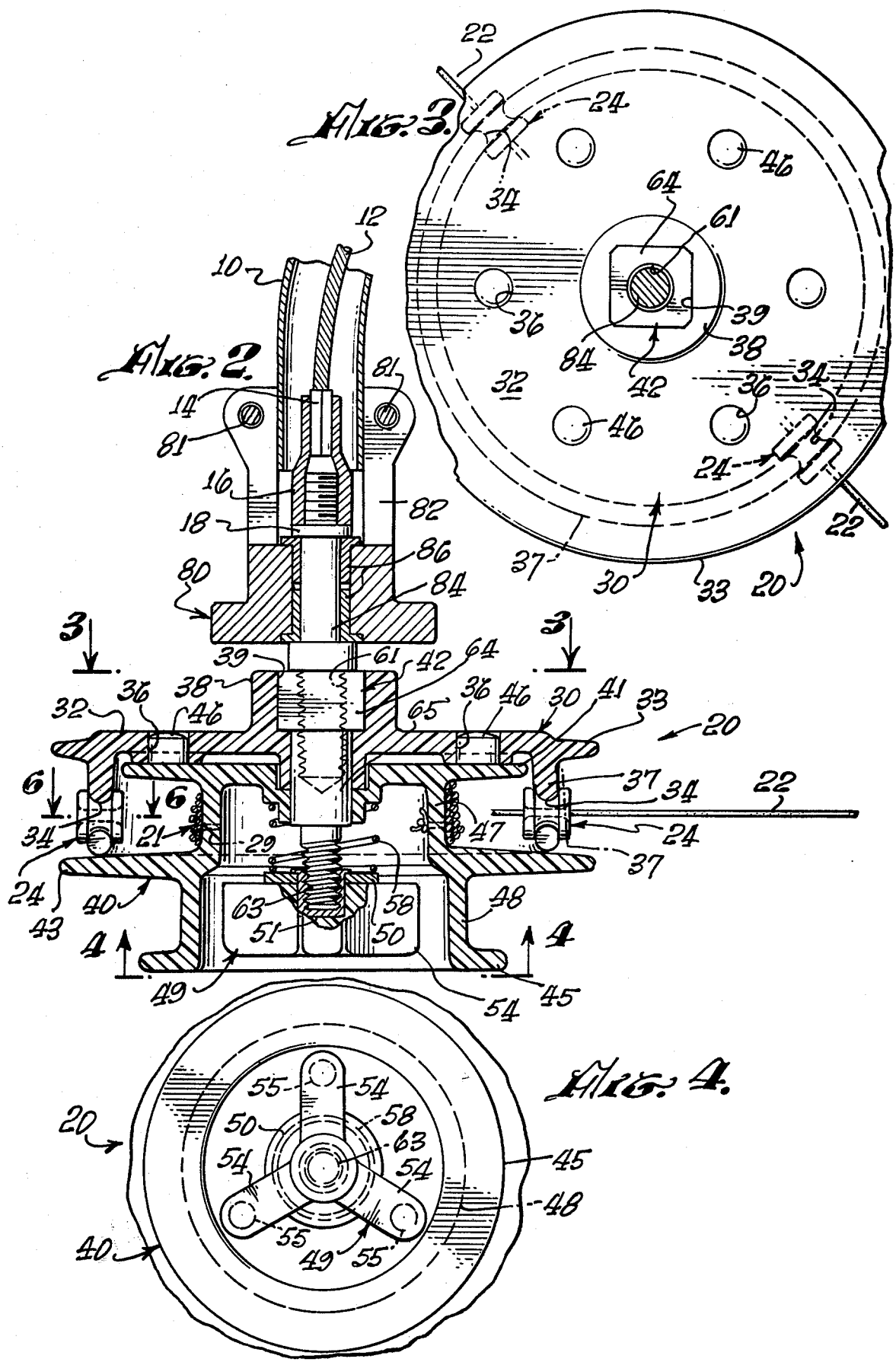

ROTARY CUTTING HEAD FOR MOWERS EQUIPPED WITH FLEXIBLE CUTTING BLADES

BACKGROUND OF THE INVENTION

The invention relates to an improved cutting head for mowing and trimming devices for grass, weeds and other vegetation, and more particularly to cutting heads equipped with flexible flails formed of cylindrical fibers.

The prior art is replete with mowing, trimming, and edging devices for the maintenance of lawns, the suppression of weeds and other applications of related nature. The bulk of this prior art technology relates to devices in which the cutting blade is a rigid member. Such mower, edgers, etc. have the great shortcomings that they cannot be operated near walls, trees or other solid obstructions for fear of damaging the cutting blade, and that if the blade should encounter a relatively small solid object, such as a stone or twig, the latter may be impelled into a trajectory where it can strike the device operator or a bystander and cause injuries.

One approach of the prior art, represented by U.S. Pat. No. 3,708,967 to Geist and Ballas and by U.S. Pat. No. 3,826,068 to Ballas, replaces the rigid cutting blade with one or more flails which are rotated in a plane by a central cutting head. At the high rotational speeds, the flexible flails are extended into substantially radial orientations by the action of centrifugal force and made sufficiently rigid to sever the relatively weak stalks of the vegetation to be cut. Because of their inherent flexibility and their low mass the flails overcome the aforementioned difficulties of the rigid cutting blades when encountering a solid object. Their tendency is to deform around the object, rather than break, or to launch the object into a random flight.

The referenced prior art Patents teach the use of a substantially cylindrical cutting head from which the flails extend radially, usually through vertical slits in the periphery of the cutting head. The trailing edges of such slits are curved, so as to prevent the imposition of high stresses at the root of the flail while deforming around an obstacle, thereby reducing breakage and wear.

While these measures of the prior art tend to reduce the incidence of breakage in the flexible flails which form the cutting blades of the improved cutting device, they do not eliminate the incidence of rupture and do not protect the flails when operated in close proximity to solid objects, such as walls, railings, trees, etc. In particular, they cannot protect the flails when deflected upwardly or downwardly out of the cutting plane, or when caught between the periphery of the cutting head and a rigid object.

It is, therefore, a primary object of the present invention to provide an improved cutting head for flail-type vegetation cutters with improved protection for the flails against abrasion and shear damage in operation.

It is an object of the invention to provide such an improved cutting head which is particularly adapted for use with flails of nylon monofilament.

It is also an object of the invention to teach the construction of improved cutting heads for rotary mowers and the like, which are simple to manufacture, easy to use, and reliable in service.

SUMMARY OF THE INVENTION

The improved cutting head of the invention attains the foregoing objects, and other objects and advantages which shall become apparent from the detailed description of the preferred embodiment thereof, in a substantially cylindrical rotating body driven from a power source directly, or through a flexible driveshaft. The flail filaments forming the cutting blades of the device are stored within the cylindrical body and the ends of the filaments are led through orifices in grommets distributed uniformly around the periphery of the body along a circumferential line coincident with the cutting plane, orthogonal to the rotational axis.

The flail filaments are made of a material with a high tensile strength and a relatively low modulus, so that the flails are highly flexible and are not self-supporting in the quiescent state. Upon rotation of the body at high speed, the flails are extended into a radial orientation by the centrifugal force acting on them, and thereby become semi-rigid. This rigidity imparts sufficient strength to the flails to permit the severance of the stalks, leaves and other components of vegetation intersecting the cutting plane. The strength and kinetic energy of the low-mass flails are insufficient, however, to cut more rigid objects, or to impart sufficient energy to impell them out of their rest positions. The preferred material of the flails is a nylon monofilament, and experience indicates that a length to diameter ratio of 20:1 or 30:1 provides the best cutting action with the least danger of damage to the flails.

To allow for the adjustment of the lengths of the flails and to provide for the replacement of damaged or broken filaments, it is preferred that the flail filaments be provided in lengths substantially longer than utilized in the cutting portions, and that the excess be stored inside the cutting head in a manner allowing for ready extension as required. Since a plurality of fails is ordinarily provided, the filaments may be wound onto individual spools or reels, or they may be wound onto the same drum and extended simultaneously.

The grommets through which the filaments exit the cutting head body are provided with a radially aligned channel of somewhat larger diameter than the filament to be utilized. The ends of the channel are flared into a curvilinear funnel at either face of the grommet, so that deflection of the flail by a solid object tends to wrap the root portion thereof around the curved funnel and provide support without the development of substantial shear or bending forces.

The filaments are protected against being abraded by such solid objects by means of radially projecting flanges above and below the plane of the grommets. These flanges extend far enough that sufficient space is provided between the outer faces of the grommets and the cylindrical peripheral contact surface of the flanges to protect the flails.

The grommets themselves are preferably constructed of a material with good lubricating properties and with a low coefficient of thermal conductivity. Molded nylon compositions have been found excellent for this service and are the preferred material for the grommets.

BRIEF DESCRIPTION OF THE DRAWINGS

The preferred embodiment of the invention is described in detail below with reference to the accompanying drawings, in which:

FIG. 1 is a perspective view of a lawn trimming apparatus employing a remote drive through a flexible driveshaft, and fitted with a cutting head in accordance with the present invention;

FIG. 2 is a vertical sectional view taken at line 2—2 in FIG. 1;

FIG. 3 is a plan view of the cutting head of FIG. 2;

FIG. 4 is a bottom view of the central portion of the embodiment of FIG. 3, illustrating the wingnut thereof, utilizing a metal threaded insert in a molded plastic body;

FIG. 5 is an exploded perspective view of the components of the cutting head of FIGS. 1 through 4; and FIG. 6 is a partial, fragmentary sectional view through the peripheral sidewall of the cutting head and through one of the grommets retained therein.

DESCRIPTION OF THE PREFERRED EMBODIMENT

FIG. 1 shows in perspective a rotary cutting head 20 and a portion of the vegetation trimming device in which it is utilized. The cutting head 20 depends from a stalk 10 which serves both as a guide tube for a driveshaft 12 and as a handle by which the user operates the cutting device. The operator uses the handle 10 to move the cutting head 20. A pair of flails 22 are impelled into a radial attitude by rapid rotation of the cutting head in the sense of the arrow A, into the grass or other vegetative growth to be trimmed, in such a manner that the plane defined by the rotating flails 22 corresponds to the desired trimmed surface.

For the sake of illustration, it may be assumed that the cutting head 20 is employed as a mower and that it will be moved through a grass-covered surface, with the cutting plane defined by the flails 22 level and at a fixed distance above the ground. As the cutting head is moved in this plane, the flails 22 encounter blades of grass and slice through them to create the desired uniform surface. By manipulating the attitude and elevation of the cutting head 20 the cutter may be employed as a trimmer or an edger, at will.

The sectional view of FIG. 2 is taken through the axis of symmetry of the cutting head 20, coincident with the axis of rotation, as established by the portion of the guide 10 proximate to the cutting head. The stalk 10 terminates in a bearing block 80 with a split upper end 82 clamped around the tube 10 by means of a pair of bolts 81. A split bushing 86 in the bearing block 80 receives an intermediate shaft 84, the upper end of which is threaded to receive an adapter 16. The adapter 16 mates, in turn, with a square drive tongue 14 integral with the driveshaft 12. The motive force of the driveshaft 12 is derived from a gasoline engine or an electric motor. A thrust washer 18 is provided between adapter 16 and the upper flange of the bushing 86 to support the weight of the cutting head 20.

The cutting head assembly has two major components: a cap 30, and a spool 40. The cap and the spool are secured together by a drive pin 42 and a wingnut 49 and are maintained in angular relationship by six studs 46 projecting from the upper surface of the spool 40 engaging six corresponding or openings orifices 36 in the upper wall 32 of the cap 30.

Referring to FIGS. 2 and 5, the cap 30 is characterized by a substantially circular upper wall 32 and a cylindrical skirt 37 depending therefrom. The membrane 32 extends beyond the outer periphery of the skirt 37 and forms a flange 33 whose function, in conjunction with a cooperating flange 43 in the spool 40, is to protect the flail filaments 22 from abrasion damage. A central boss 38 rises from the membrane 32 around a cylindrical orifice in the wall. The internal contour of the boss 38 is formed into a substantially square socket 39 for the reception of a mating head 64 on the drive pin 42. The substantial interacting faces of the head 64 and of the socket 39 ensure a good torque transmission capacity between the drive pin and the cap 30, alleviating problems commonly associated with reliance on purely frictional fits for the transfer of the cutting torque.

Two vertical slots 34 are machined into the cylindrical skirt 37, centered on a diameter passing through the rotational axis. The slots 34 are receptacles for a pair of grommets 24 through which the cutting filaments are guided to form the flails 22 of the vegetation trimming device. The grommets 24 are free to translate within the slots 34, their travel being limited in a downward direction by the upper surface of the flange 43 of the spool member 40.

The spool 40 is provided with an upper flange 41 which is sized to fit slidably within the inner perimeter of the skirt 37, and which is spaced from the flange 43 by a cylindrical body portion 47. Another cylindrical portion 48 depends below the flange 43 and terminates in a lower flange 45. The cylindrical body portion 47, intermediate between flanges 41 and 43, serves as a storage spool for the flail filaments. A typical supply 21 of filament is shown in FIG. 3, its outboard end extended into a flail 22 and its inboard end secured to the spool 40 by a terminal knot, after passing through a peripheral orifice 29 in the body portion 47.

In the course of preparing the cutting head 20 for use, a pair of filaments are passed through appropriate orifices 29 and secured by terminal knots, the filaments wound onto the body portion 47, in the same sense for each filament, and grommets 24 engaged on the outermost segments of the filaments.

The next step in the assembly procedure is the insertion of the spool 40 into the cap 30, with the grommets 24 slidingly entrapped in the slots 34. The two parts of the cutting head are then secured together, and against relative rotation by mating the studs 46 with their receptacle orifices 36 in the cap, through the insertion of the drive pin 42 into the boss 38, and the engagement of threaded portion 63 in the drive pin by the wing nut 49.

The drive pin 42 is provided with a cylindrical portion 65, intermediate between the square drive head 64 and the threaded shank 63, upon which a spring 58 is located intermediate the lower face of flange 45 and a thrust washer 50 affixed to the upper face of the wing nut 49. The thrust washer is secured into solid assembly with the wing nut by a flange around the outboard face of a threaded insert 51 which is molded into the plastic body of the wing nut 49. The use of the insert 51 not only provides a ready means for securing the thrust washer 50 in place, but also provides a metallic mating thread for the shank portion 43, so that the wing nut may be constructed of plastic, for light weight and economy, without incurring the shortcomings, such as stripping of threads, associated with reliance on thread engagement in plastic materials.

The main body of the wing nut includes three equally spaced tabs 54 for ease of assembly and disassembly. The tabs 54 are pierced by orifices 55 whose presence further reduces the weight of the wing nut assembly.

Whenever it becomes necessary, due to damage or wear in service, to release and extend additional portions of filament to serve as flails 22, the wing nut 49 is slackened on the threaded shank 63 and the spool 40 rotated with respect to the cap 30 to pay out filament from the storage 21. This is accomplished by a relative axial motion of the two members, disengaging the studs 46, a subsequent rotation, and is completed by allowing the studs 46 to slide into the orifices 36 in the newly established angular alignment of the cap and spool members. The wing nut is then tightened and the cutting head is ready to resume trimming operations.

The entire cutting head 20 may be readily removed from the drive assembly by counterclockwise rotation of the head relative to the handle 10 and bearing block 80. Such rotation frees the threaded portion of the intermediate driveshaft 84 from a mating threaded hole 61 in the head 64 of the drive pin 42. Reassembly is accomplished by reversing the foregoing procedure.

FIG. 4 shows a bottom view of the cutting head assembly, showing the relative locations of the wing nut 49 within the downwardly open body portion 48.

FIG. 3 is a top view of the cutting head 20, showing the sectional shape of the mating interface between the socket 39 and the drive head 64, and the uniform angular spacing of the studs 46. It should be noted that the studs 46, together with their mating orifices 36 in upper flange 32 of cap 30, serve the dual function of permitting a fine adjustment of the lengths of the flails 22 and of transmitting the drive motion from the cap to the spool in order to prevent variations in flail length due to slippage between the two components of the cutting head.

FIG. 6 is a fragmentary sectional view through a portion of the skirt 37, encompassing a slot 34 and a grommet 24 retained therein. The grommet has the form of a spool, with a symmetrical flange 26 at each end of a body 27. The grommet body 27 is shaped to fit the sectional contour of the slot 34. A central orifice 25 passes through the grommet and expands into curvilinear funnels 28 at either end. When in use, a flail 22 is passed through the orifice 25, and the flared entry and exit funnels prevent the imposition of severe shear and bending forces due to angular misalignment of the filament.

The grommet is constructed of a rigid material, preferably with a low thermal conductivity. The latter characteristic, in combination with a low coefficient of friction with respect to the material of the flail 22, prevents an undue buildup of heat in the grommet, either from frictional generation or by transfer from other components of the trimming device. Such heat buildup softens the flail material and results in the well known prior art problem of flail fraying and breakage caused by the softening. It has been found that for flails of nylon monofilament the use of molded nylon compositions in the grommets provides a very compatible material environment and leads to a long service life.

While the grommets ensure that common causes of flail damage, the imposition of severe loads at the point of issue from the cutting head, are substantially reduced in effect, an additional feature of the cutting head 20 prevents another mechanism of damage from coming into play. This feature includes the cooperating flanges 33, 43 which extend radially beyond the outer faces of the grommets sufficiently to shield the flails 22 from contact with any solid object against which the cutting head may bear. When the gap between the outer face of the grommets and the protective surface established by the imaginary surface of revolution tangent to the protective flanges, exceeds the diametral dimension of the flail filament, the latter may be deflected by an adjoining object but will not be crushed between such object and the cutting head. Such entrapment is a common cause of abrasive damage to, and breakage of, flails with cutting heads of the prior art, severely restricting the utility of such prior art cutting heads in trimming operations around trees, boulders, walls, fences and other solid obstructions, and creating personal injury hazards from flying pieces of flail material.

To allow for curvature in the obstructing objects and for radial flexion of the skirt 37 under centrifugal loading, as illustrated in the dotted outline 37 of FIG. 2, the gap between the outer faces of the grommets 24 and the linear surface defined between the protective flanges 33 and 43 should be greater than the diameter of the flail filament, and is preferably at least twice that diameter.

There is no restriction of constructional material in any component of the cutting head 20, but the desirability of low weight and low rotational inertia creates a preference for plastics or low-density metals, such as magnesium or aluminum, for the cap and spool members.

The improved cutting head of the invention has been described with reference to the preferred embodiment thereof; variations in the mechanical layout or shape of the component parts, in the number of flails utilized, or in the manner of storing flail filament within the spool body, may suggest themselves to one skilled in the art upon exposure to the teachings herein. Such variations are deemed to be encompassed by the disclosure of the invention, delimited only by the appended claims.

I claim:

1. An improved cutting head for apparatus for mowing and trimming vegetation by means of cutting flails formed of elongated fibers, said cutting head comprising:
   a cylindrical body rotatable about a central axis and containing within internal volumes thereof supplies of elongated cylindrical fiber to form said cutting flails,
   guide means including a plurality of grommets secured in openings in the periphery of said body, each of said grommets having a central opening radially disposed to the axis of rotation for extension therethrough of an elongated fiber from the supply within the body,
   said openings being slots substantially parallel to the axis of rotation and uniformly spaced about the periphery of the body, and said grommets being reciprocably secured in the slots,
   said grommet opening having an enlarged radially outward portion defined by a curvilinear wall to support the fiber when a portion thereof is extended to form a cutting flail and is deflected from a radial orientation by contact with foreign objects to minimize stress, shear and bending forces on the cutting flail extending radially therethrough, and
   a pair of circumferential flanges extending radially about the body and beyond the radially outer faces of the grommets, one flange being above and one flange being below the grommet to protect the cutting flails against abrasion and breakage by being crushed between the cutting head and foreign objects.

2. A cutting head according to claim 1, wherein: said guide means include a pair of grommets secured in two diametrally opposed openings.

3. An improved cutting head according to claim 1 wherein:
   said elongated cylindrical fiber is nylon monofilament and said grommets are constructed at least in part of plastic of low thermal conductivity to minimize heat build up therein to minimize softening of the fiber supported thereby and resultant breakage thereof.

4. A cutting head according to claim 1 wherein the grommets are constructed of a plastic composition.

5. The improved cutting head as defined in claim 1 wherein said cylindrical body includes:
   a first cylindrical body portion having said flange above the grommets positioned thereon and said slots defined therein,
   a second cylindrical body portion having said flange below the grommets positioned thereon, and
   means connected to said first and second cylindrical body portions for releasably connecting said first and second cylindrical body portions together.

6. The improved cutting head as defined in claim 5 wherein said means for releasably connecting said first and second cylindrical body portions together include:
   a threaded shaft of predetermined length connected to said first cylindrical body portion,
   at least one abutment surface on said first cylindrical body portion,
   at least one abutment member positioned on said second cylindrical body portion for engagement with said abutment surface,
   a domed wing nut within said second cylindrical body portion for engagement and locking with a predetermined portion of the end of said threaded shaft, and
   bias means between said domed wing nut and said second cylindrical body portion positioned to maintain engagement of said abutment surface and abutment member.

7. The improved cutting head as defined in claim 6 wherein said second cylindrical body portion includes a second flange which is lower than said flange below the grommets and said domed wing nut.

8. The improved cutting head as defined in claim 6 wherein said wing nut includes three spaced wings having hollow outer extremities to reduce the mass thereof.

9. An improved cutting head for apparatus adapted for mowing and trimming of vegetation by means of flails formed of elongated, substantially cylindrical fibers projecting radially from the cutting head, said improved cutting head comprising:
   a cap member having a substantially circular upper flange and rotatable about a central axis, with a cylindrical skirt smaller in diameter than said flange and concentric therewith, depending from the flange;
   a spool member having first and second spaced circular flanges concentrically affixed to a cylindrical body, said first flange fitting within said skirt and said second flange having substantially the diameter of said upper flange;
   positional engagement means including a plurality of studs upwardly projecting from said first flange into engagement with registering openings in said upper flange with said spool member inserted into said cylindrical skirt;
   supplies of flail fibers wound around said cylindrical body between said first and second flanges;
   guide means including a plurality of elongated slots parallel to said central axis and equally spaced about the periphery of of said skirt, with a grommet slidably secured in each of said slots and having a central opening radially disposed to the central axis and flared at either end into curvilinear funnels for the support of a fiber extending therethrough to form one of said flails; and
   locking means securing said spool member in said cap member with said studs engaging said orifices.

10. An improved cutting head according to claim 9, and further including:
    a pair of circumferential flanges extending radially about the body and beyond the radially outer faces of the grommets, one flange being above and one flange being below the grommet to define a space to receive flails deflected by foreign objects to protect the cutting flails against abrasion and breakage by being crushed between the cutting head and foreign objects.

11. A cutting head according to claim 9 wherein the grommets are constructed of a plastic composition.

* * * * *